Figure 1:
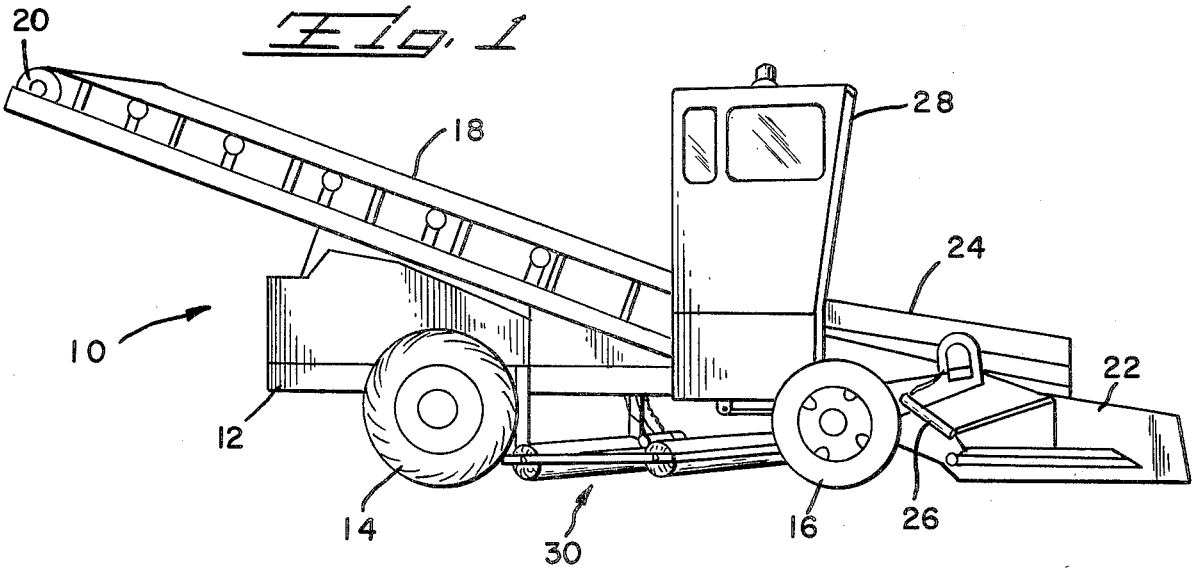
Figure 2:
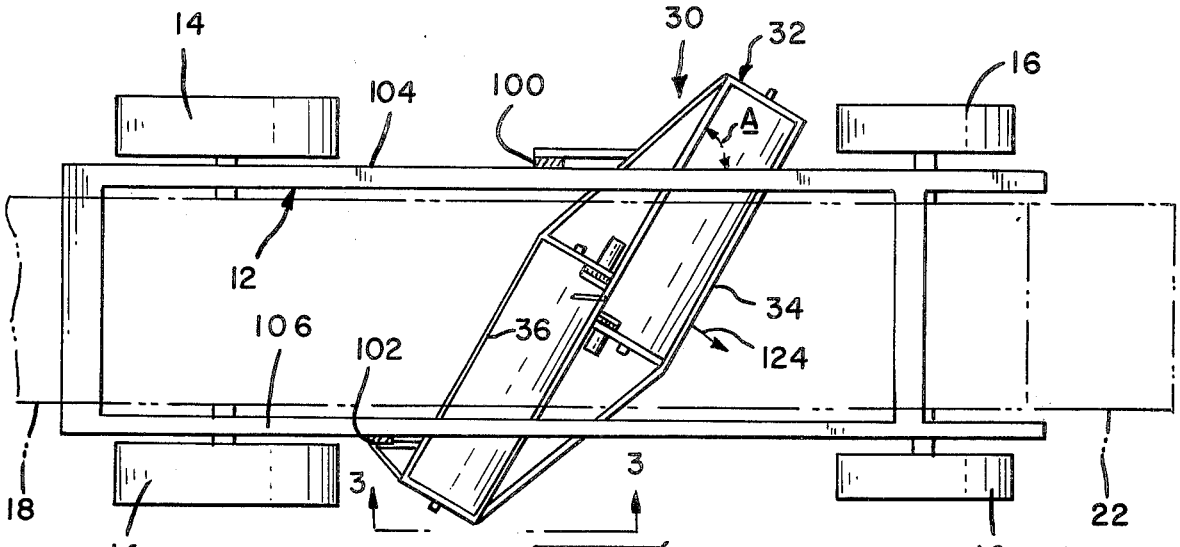
Figure 3:
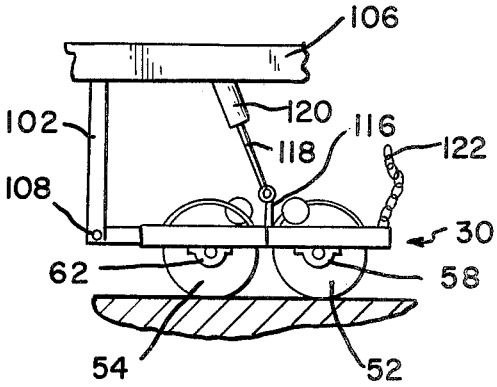
Figure 4:
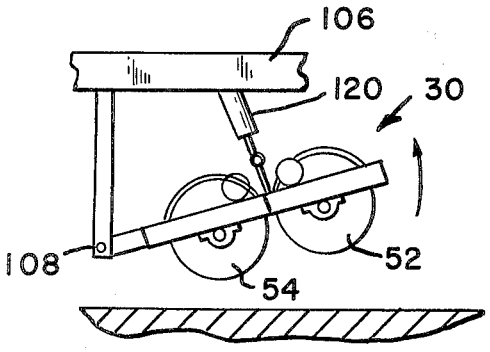
Figure 5:
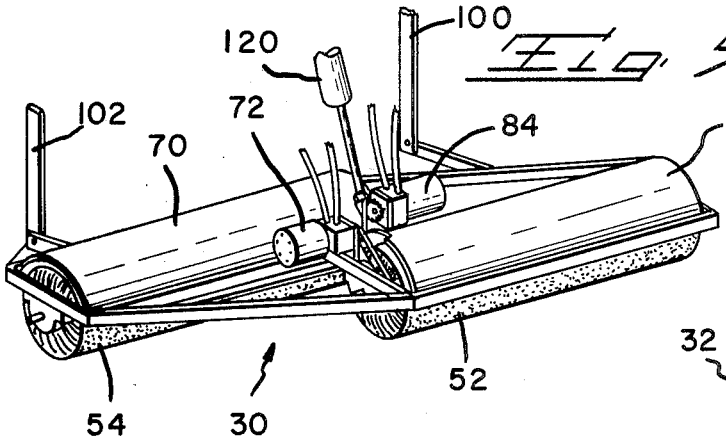
Figure 6:
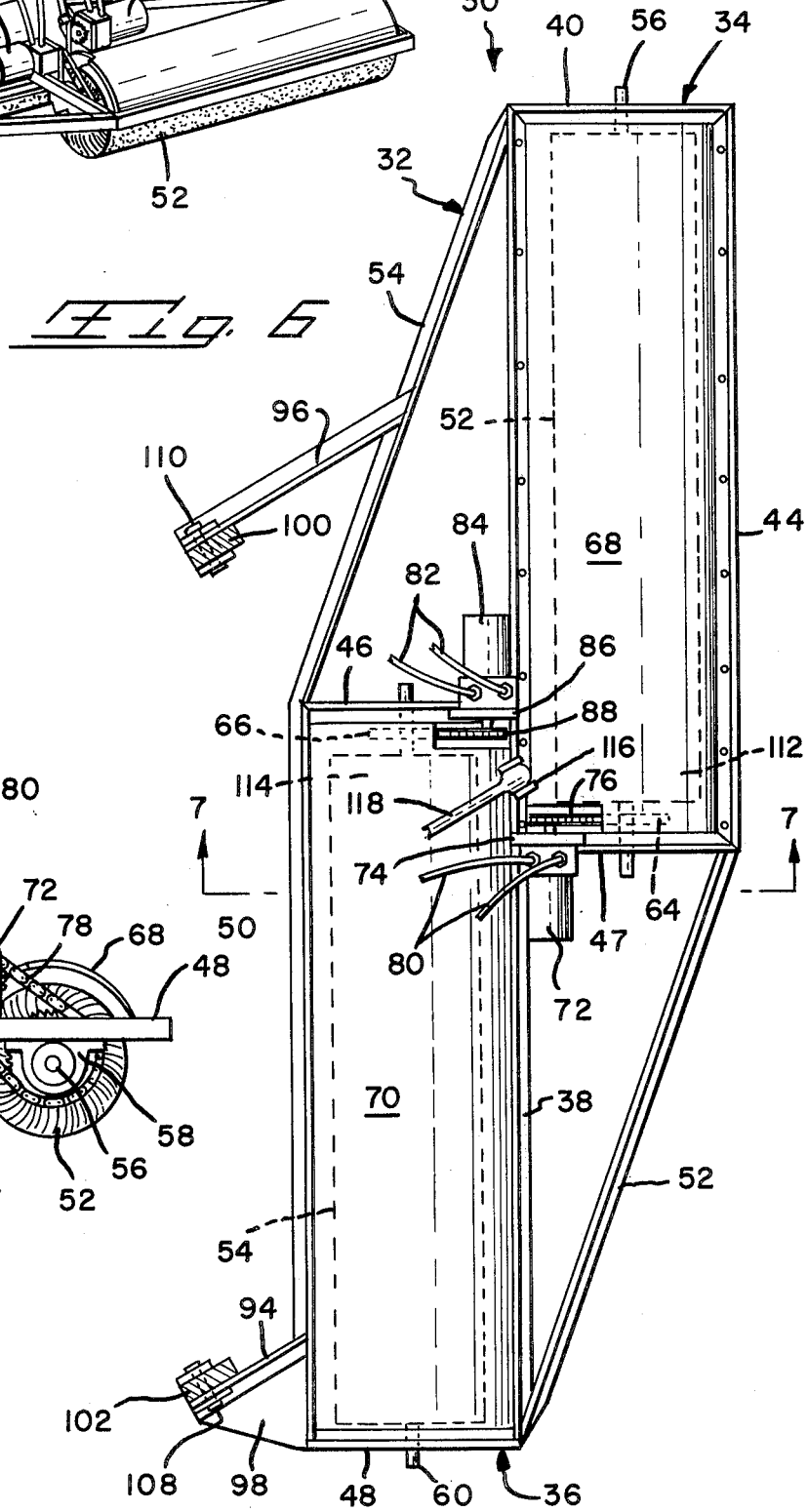
Figure 7:
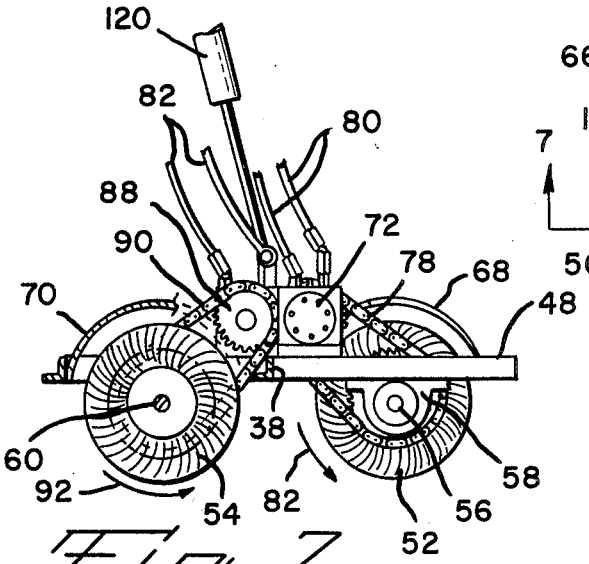

United States Defensive Publication [19] (H) [11] T987,001

O'Brien [43] Oct. 2, 1979

[54] BELT LOADER HAVING SWEEPING ASSEMBLY

[75] Inventor: Louis G. O'Brien, Camp Hill, Pa.

[73] Assignee: The Pennsylvania Department of Transportation, Harrisburg, Pa.

[21] Appl. No.: 28,529

[22] Filed: Apr. 9, 1979

[51] Int. Cl.[2] ..... E01H 1/05

[52] U.S. Cl. ..... 15/82

[57] ABSTRACT

An improved belt loader of the type used to remove debris from a roadway includes an angled sweeping assembly comprising a pair of overlapping power driven rotary brushes with the downstream end of the lead brush overlapping the upstream end of the trailing brush so that the debris swept by both brushes is moved across the assembly and deposited by the side of the roadway.

1 Claim, 2 Sheets Drawing,

8 Pages Specification

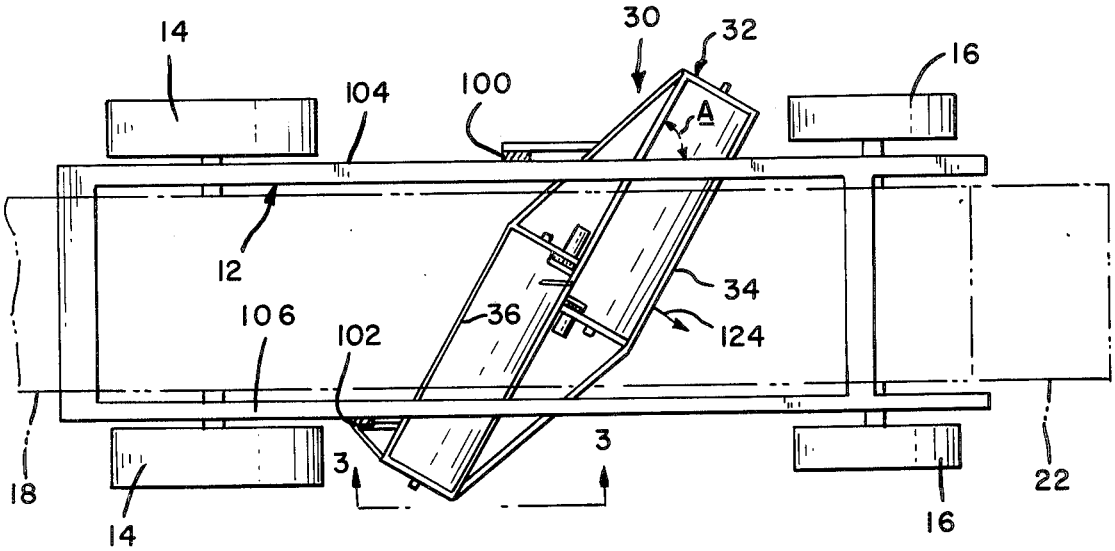

The file of this unexamined application may be inspected and copies thereof may be purchased (849 O.G. 1221, Apr. 9, 1968).